O. A. KUBAT.
GLARE SHIELD.
APPLICATION FILED MAY 20, 1916.
1,286,352.
Patented Dec. 3, 1918.
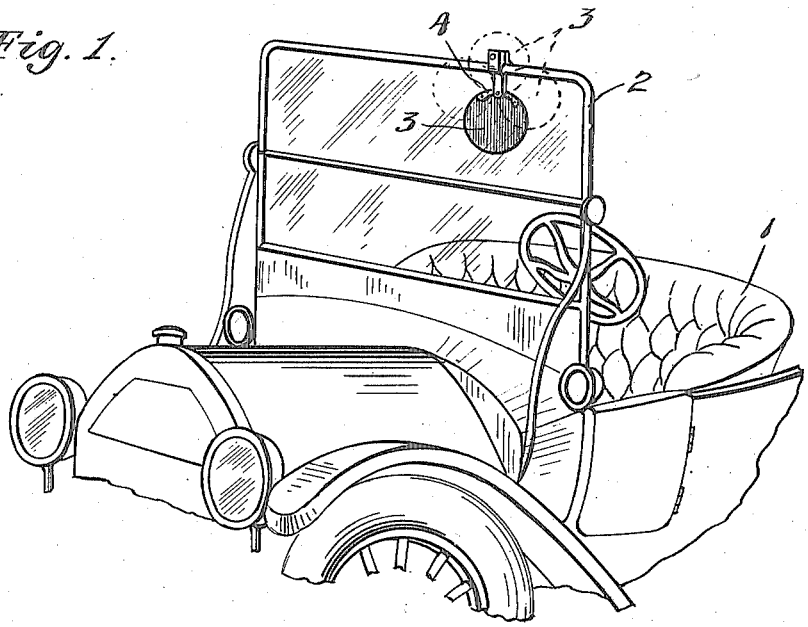
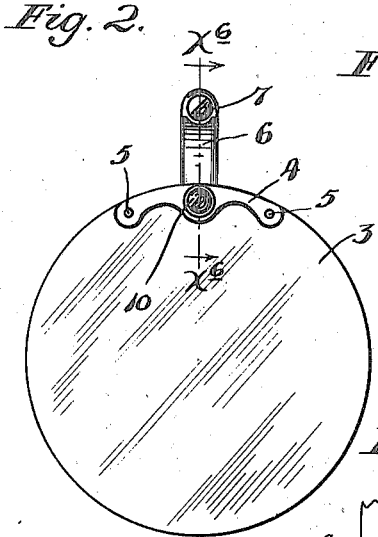
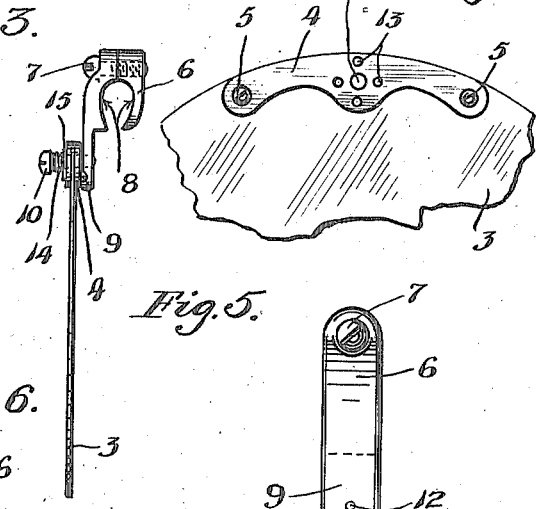
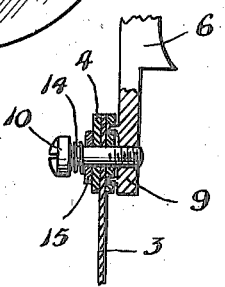
Witnesses
H. L. Opsahl.
E. C. Wells
Inventor.
Otto A. Kubat.
By his Attorneys.
Williamson Merchant

UNITED STATES PATENT OFFICE.

OTTO A. KUBAT, OF OWATONNA, MINNESOTA.

GLARE-SHIELD.

1,286,352.  Specification of Letters Patent.  Patented Dec. 3, 1918.

Application filed May 20, 1916. Serial No. 98,799.

*To all whom it may concern:*

Be it known that I, OTTO A. KUBAT, a citizen of the United States, residing at Owatonna, in the county of Steele and State of Minnesota, have invented certain new and useful Improvements in Glare-Shields; and I do hereby declare the following to be a full, clear, and exact description of the invention, such as will enable others skilled in the art to which it appertains to make and use the same.

My invention has for its object to provide an extremely simple and highly efficient glare shield, especially adapted for use in connection with the wind shield of a motor vehicle for dimming the rays of the sun, or of an artificial light, such as the lamps of an approaching vehicle; such rays of light and reflections on the glass of the wind shield being very trying on the eyes of the person driving the machine.

To the above end, generally stated, the invention consists of the novel construction and arranging of parts, hereinafter described and defined in the claim.

In the accompanying drawings, which illustrate the invention, like characters indicate like parts throughout their several views.

Referring to the drawings,

Figure 1 is a fragmentary view in perspective of an automobile equipped with a wind shield to which is attached my improved glare shield, said glare shield being shown in different positions by means of broken lines;

Fig. 2 is an elevation of the improved glare shield;

Fig. 3 is an edge elevation of the same;

Fig. 4 is a fragmentary detail view of the improved glare shield, on an enlarged scale;

Fig. 5 is an elevation of the supporting bracket; and

Fig. 6 is a detail view in section taken on the line $x^6$ $x^6$ of Fig. 2, on an enlarged scale.

The numeral 1 indicates as an entirety an automobile, having mounted on its dashboard a wind shield, indicated as an entirety by the numeral 2, and to which wind shield the invention is applied in working position.

The numeral 3 indicates the improved glare shield, which, as shown, is in the form of a disk cut from a single sheet of flexible translucent material, such as celluloid and of a color that will dim the rays of light and that is restful to the eyes. On the marginal edge portion of the glare shield 3, is a pair of circumferentially extended metal plates 4 located, one on each side of the glare shield and detachably connected and clamped thereto by a pair of screws 5.

The glare shield 3 is detachably connected to the frame of the wind shield 2 by a two-part clamping bracket 6, the members of which are detachably and adjustably connected by a screw 7. The members of the bracket 6 are recessed at 8 to receive the frame of the wind shield 2 and by turning the screw 7, the said members may be frictionally clamped onto the frame of the wind shield 2. One of the members of the bracket 6 is provided with an extension 9, having formed therethrough an internally screw-threaded bore into which is screwed a pivot bolt 10, that extends transversely of the wind shield 3. This pivot bolt 10 is passed through alined holes 11 in the glare shield 3 and plates 4 and pivotally connects the glare shield 3 to the bracket 6 for adjustments in its own plane and in the plane parallel to the wind shield 2. In the drawings, the bracket 6 is shown clamped onto the upper horizontal member of the wind shield 2, but it is, of course, understood that the same may be attached to either of the vertical members thereof.

The glare shield 3 is yieldingly held in predetermined set positions on the bracket 6, by a friction device comprising conical friction pins 12 and coöperating seats or indentations 13. The elements of this friction device 12—13 are circumferentially spaced around the pivot bolt 10 and the pins 12 are rigidly secured on the extension 9 of the bracket 6 and the seats 13 are formed in the adjacent reinforcing strip 4. The friction device 12—13, shown, is arranged to hold the glare shield 3 in four different positions 45 degrees apart, but it is, of course, understood that the glare shield 3 may be set in other adjustments, if so desired. A coiled spring 14 is compressed between the head of the bolt 10 and a washer 15 on said bolt and bearing against the adjacent reinforcing strip. By turning the screw 10, the tension on the spring 14 may be varied, at will, to regulate the frictional contact between the pins 12 and seats 13.

To change the glare shield from one adjustment to another on the bracket 6, it is only necessary to take hold of said glare shield and move the same in its own plane on the pivot bolt 10. This movement of the glare shield 3 will cam the conical pins 12 out of the seats 13 against the tension of the spring 14. With the pins 12 out of the seats 13, the same will ride over the face of the adjacent reinforcing plate 4, until the seats 13 are again engaged by the pins 12, under the action of the spring 14, which engagement will stop the pivotal movement of the glare shield.

From the above description, it is evident that the glare shield may be very easily applied to any part of the frame of the wind shield or removed therefrom. The glare shield may also be adjusted on the bracket 6 to change the field of vision therethrough, or to absorb rays of light coming from some particular direction. The bracket 6 holds the glare shield close to and parallel with the wind shield 2, where it is wanted.

What I claim is:—

The combination with a bracket, of a glare shield formed from a single piece of translucent material, a pair of circumferentially extended reinforcing plates applied to opposite sides of the glare shield, means for fastening said plates to the glare shield, an adjusting screw having screw threaded engagement with the bracket and extending through a bore in the glare shield and reinforcing plates to afford a pivot for said glare shield, friction pins on the bracket and co-operating seats in the inner reinforcing plate, said friction pins and seats being circumferentially spaced around said pivot, and a coiled spring encircling said pivot and compressed between the head thereof and the outer reinforcing plate for yieldingly holding the friction pins in said seats.

In testimony whereof I affix my signature in presence of two witnesses.

OTTO A. KUBAT.

Witnesses:
F. A. ALEXANDER,
MARIAN ALEXANDER.